United States Patent [19]
Richardson

[11] 3,732,927
[45] May 15, 1973

[54] PLUGGING SOLUTION PRECIPITATION TIME CONTROL BY CHARGE NEUTRALIZATION

[75] Inventor: Edwin Allen Richardson, Houston, Tex.

[73] Assignee: Shell Oil Company, Houston, Tex.

[22] Filed: July 29, 1971

[21] Appl. No.: 167,460

[52] U.S. Cl. ................................................ 166/294
[51] Int. Cl. .......................................... E21b 33/138
[58] Field of Search ...................... 166/294, 292, 300

[56] References Cited

UNITED STATES PATENTS

| | | |
|---|---|---|
| 2,238,930 | 4/1941 | Chamberlain et al. ............... 166/292 |
| 3,614,985 | 10/1971 | Richardson ......................... 166/294 |
| 2,156,220 | 4/1939 | Dunn.................................... 166/294 |
| 3,244,230 | 4/1966 | Sharp .................................. 166/292 |
| 3,522,844 | 8/1970 | Abdo................................166/294 X |

*Primary Examiner*—Stephen J. Novosad
*Attorney*—Harold L. Denkler et al.

[57] ABSTRACT

The precipitation time of a precipitate-forming aqueous solution containing a polyvalent metal that precipitates as a gelatinous metal hydroxide and a reactant that raises the pH to cause the precipitation is decreased by dissolving an incompletely dissociated polyvalent acid in the aqueous solution.

6 Claims, No Drawings

PLUGGING SOLUTION PRECIPITATION TIME CONTROL BY CHARGE NEUTRALIZATION

BACKGROUND OF THE INVENTION

This invention relates to a homogeneous solution precipitation type of gelling or plugging agent for producing a relatively immobile gelled fluid and/or precipitate for reducing the permeability of a permeable material. The present invention provides plugging solution formulations that are similar to those described in copending patent application, Ser. No. 23,550, filed Mar. 30, 1970, by E.A. Richardson now U.S. Pat. No. 3,614,985, except for the inclusion of an incompletely dissociated polyvalent acid.

SUMMARY OF THE INVENTION

This invention provides a precipitate-forming solution which is adapted to maintain its homogeneity and a selected degree of mobility throughout a selected combination of time and temperature and then become relatively immobile due to the precipitation of a gelatinous metal hydroxide. The present precipitate-forming solution comprises an aqueous solution of a polyvalent metal that forms a gelatinous metal hydroxide, a pH-increasing reactant and a polyvalent acid that is partially dissociated in the pH range at which the gelatinous metal hydroxide is precipitated.

DESCRIPTION OF THE INVENTION

The present precipitate-forming solutions are useful in numerous well treating, fluid diverting, or permeable material plugging operations. They are generally useful wherever it is desirable to flow an aqueous solution having a selected mobility into a selected location at which the mobility of the solution becomes significantly reduced. They can be used in treating wells and/or boreholes for purposes such as: plugging portions of a subterranean reservoir from which (or into which) it is no longer desirable to produce (or inject) fluid; plugging an earth formation to shutoff an intrusion of water into a gas drilled well borehole; improving the uniformity of the injection profile of a reservoir interval; pretreating the borehole of a well in which a casing is to be cemented (by preceding the cement with a slug of fluid that penetrates into reservoir rocks, micro fractures, and the like and subsequently gels) to supplement the sealing effect of the cement; preventing or controlling the loss of fluid that is being circulated within a well or borehole; etc.

The present invention is particularly useful for providing a selective plugging process for increasing the uniformity with which a plugging agent is distributed throughout the more permeable portions of a region of non-uniform permeability. Such a selective plugging is preferably accomplished by the following steps: (1) fluid is injected into the permeable region to form a stream flowing between a fluid source and the most permeable zone within the region; (2) the precipitate-forming solution of the present invention is included in that stream; and (3) the composition of the precipitate-forming solution is adjusted (with respect to its metal ion concentration, initial pH, proportion of incompletely dissociated polyvalent acid, the temperatures in the permeable region and at a point at which the solution is compounded, and the rate at which the solution is injected into the permeable region) so that the metal hydroxide precipitation occurs in each portion of the injected plugging solution within a selected generally short time after each portion enters the permeable region.

In such a selective plugging process, the mobility of the precipitate-forming solution is preferably made substantially equal to that of the remainder of the fluid that forms the flow stream between the fluid source and region being treated. The procedure is advantageous in insuring that all or most of the initial portions of the plugging solution flow into the most permeable zones within the region being treated. The most permeable zones may be the most permeable layers or the largest pores that may be located within some or all portions of the region. In such a plugging procedure, the first arriving older portions of the plugging solution are displaced by the later arriving younger portions and, as the older portions of the solution begin to gel and become less mobile, their gelation occurs within their most permeable zones. The following younger portions of the plugging solution are thus diverted and, by increasing the injection pressure, are forced into zones of lower permeability. When the younger portions begin to gel, they do so within zones that initially were less permeable than the most permeable zones; and, the plugging material is distributed substantially uniformly throughout all of the more permeable portions of the region.

The hydrolysis of urea in a dilute (<0.1M) aluminum chloride solution produces a fine precipitate of hydrated alumina. At higher aluminum concentrations, a soft alumina gel is produced. The gel is formed when the molar concentration ratio ($R$) of base to aluminum is about 2.4. In practice, the system $R$ ratio is initially adjusted to the range $R_i=2.0-2.3$ with NaOH or KOH and sufficient urea added to cause gel formation upon subsequent urea hydrolysis. The gel time is adjusted by the initial $R_i$ value and urea concentration. The effect of $R_i$ on the gel time is typified by the behavior at 190°F and 200°F of a 0.5M $Al^{+3}$ solution with a urea/$Al^{+3}$ ratio ($R_u$) of $R_u = 2.0$. In this system, the alumina colloid is stabilized by adsorbed positively charged hydrogen ions, $H^+$. The difference between $R = 2.4$ (the gel-initiating $R$ value) and the $R_i$ value is a measure of the excess $H^+$ ion that must be neutralized by urea hydrolysis. Where the $R_i$ is about 2.3 the gel time is about 350 minutes (almost 6 hours).

There is a limit to the gel time that can be obtained by increasing $R_i$. At $R_i$ values greater than about 2.34, gel times accelerate rapidly and practical control of the system is lost. An additional upper limit on $R_i$ results from problems in mixing high $R_i$ solutions. When $NH_4OH$ or $KOH$ is added to aluminum chloride solutions, high local solution pH results in weak gel formation. Time is required for repeptization, cleaning and aging of the solution. The higher the $R_i$, the longer the time required for clearing.

In the present invention, the aqueous solution in which the alumina colloid tends to be formed and stabilized by adsorbed positively charged hydrogen ions ($H^+$) also contains at least one incompletely dissociated polyvalent acid having an ionization constant of less than about 3.2 $pKa$. The term ionization constant relates to a dissociation equation of the type $$K_1 = \frac{(H^+)(A^-)}{(HA)}$$

where the terms in the parentheses are the concentrations of, respectively, the hydrogen ions ($H^+$) and the anions of an incompletely dissociated acid $HA$ ($A^-$) along with the concentration of undissociated acid ($HA$). $K_i$ is usually expressed in terms of a negative logarithm of the indicated ratio of concentrations referred to as the pKa of the acid. Incompletely dissociated polyvalent acids often undergo a series of dissociation reactions and have a series of ionization constants. For example, oxalic acid dissociates in accordance with the equations:

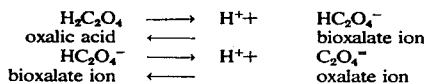

$$\begin{array}{lll}
H_2C_2O_4 \longrightarrow & H^+ + & HC_2O_4^- \\
\text{oxalic acid} \longleftarrow & & \text{bioxalate ion} \\
HC_2O_4^- \longrightarrow & H^+ + & C_2O_4^{--} \\
\text{bioxalate ion} \longleftarrow & & \text{oxalate ion}
\end{array}$$

Oxalic acid has the ionization constants $pK_1 = 1.19$ and $pK_2 = 4.21$. Examples of other incompletely dissociated polyvalent acids that can be used in the present invention include those listed in the following table.

TABLE 1

| Acid | $pKa_1$ | $pKa_2$ | $pKa_3$ |
|---|---|---|---|
| Citric | 3.06 | 4.74 | 5.4 |
| Phosphoric | 2.12 | 7.21 | 12.32 |
| Malonic | 2.86 | 5.7 | |
| Succinic | 4.21 | 5.64 | |
| Glutaric | 4.34 | 5.27 | |
| Adipic | 4.41 | 5.28 | |
| Oxaloacetin | 2.56 | 4.37 | |
| Maleic | 1.92 | 6.25 | |
| Fumaric | 3.02 | 4.38 | |
| Tartaric | 3.03 | 4.37 | |

The precipitate-forming systems of the present type are substantially immune to the effects of pressure. This adapts them for well treating uses in which the absolute pressure in the subterranean permeable intervals are relatively high, such as several thousand pounds per square inch. Tests conducted with systems described in the above-identified copending patent application established that pressure has no appreciable effect and can be ignored. It has similarly been determined that the presence of residual oil in a permeable interval in which a plugging agent is to be deposited exerts little or no adverse effect.

In the precipitate-forming solutions of the present invention, the essential ingredients comprise an aqueous liquid solution of (a) a salt of a polyvalent metal of the specified type, (b) a pH-increasing reactant, such as urea, and (c) an incompletely dissociated acid of the specified type. Such solutions can advantageously contain various additional ingredients as long as the latter do not interfere with the above described functions of the above essential ingredients. For example, when a plugging material is to be deposited in a permeable region containing fractures and/or vugs of relatively large pores, the precipitate-forming solutions can advantageously contain a suspension of solid particles, such as crushed sand grains, carbonates, walnut shells, or the like, to cause a passageway-bridging effect and/or to add additional permeability reducing solids material. Where such a permeable zone contains water-sensitive clays, the precipitate-forming solutions can advantageously contain clay-stabilizing materials, such as neutral salts, amines, amine salts, or the like although polyvalent metal salts such as aluminum chloride are, themselves, clay-stabilizing materials. Where desirable, for example in view of a particular distribution of the thicknesses and permeabilities of various layers or pores within a permeable interval, or in view of other needs for a relatively high initial viscosity, the precipitate-forming solutions can contain thickening agents such as partially hydrolyzed polyacrylamides, carboxymethylcellulose, and the like types of water thickening materials.

The polyvalent metal salts used in the present precipitate-forming solutions can comprise substantially any such salt which is soluble in an aqueous solution of relatively low pH and is precipitated as a hydrated metal oxide from an aqueous solution of a moderately higher pH. Such salts are preferably soluble at a pH of from about 2 to 7 and precipitated at from about 7 to 10. The preferred polyvalent metal salts are salts of metals that form gelatinous metal hydroxides or hydrated metal oxides of very low water solubilities. Such metals are typified by aluminum, chromium, iron, copper, bismuth, etc. Such metals are preferably used in the form of salts having relatively high water-solubility in aqueous solutions having a pH of from about 2 to 7, such as the chlorides, nitrates, acetates, or the like.

The present precipitate-forming solutions can contain a wide variety of pH-adjusting materials. Such materials are inclusive of substantially any water-soluble compound or mixture which reacts within a water solution to produce one or more water-soluble alkaline products that increase the pH of the solution. Suitable materials include urea, a mixture of urea and a nitrite salt, water-soluble amides of carbamic acid such ammonium carbamate, carbonic acid halides, urea salts of cyanic acid, such as the alkali metal cyanates, cyanamide, and the like.

The concentration of the polyvalent metal salt and the pH-adjusting reactant can be varied over relatively wide limits. Either of these components can be present in proportions ranging from about 0.1 percent by weight of the aqueous solution to an amount as high as about 30 percent or more that forms a substantially saturated solution. In precipitate-forming solutions containing a relatively low concentration of polyvalent metal salts, the precipitates tend to be discrete particles of gelatinous metal hydroxides, and solutions containing higher concentrations tend to become gels.

Where the pH of an aqueous solution of a particular polyvalent metal salt is relatively low, it can be increased by adding an alkaline material, for example, the pH of an aqueous solution of aluminum chloride is preferably increased (by the addition of a hydroxide, such as an ammonium, sodium and/or potassium hydroxide) to a value of about 4. Potassium cyanate can advantageously be added in order to utilize its relatively rapid hydrolysis at relatively low temperatures to raise the pH of the solution to one from which gellation can readily be induced with a selected time with a relatively low concentration of the urea and nitrite ion reactants.

Where nitrite ions are used they can be incorporated in the present plugging solutions in the form of substantially any water-soluble nitrite salt. The alkali metals and ammonium nitrites are generally suitable and the sodium and potassium nitrites are particularly suitable.

In the present invention the relatively rapid urea/nitrite reaction can be used in conjunction with the partially dissociated polyvalent acid to provide a means for adapting the precipitate-formation to occur in response to a relatively wide range of times at any of a relatively wide range of temperatures. For example, in order to shorten the delay between the time of mixing and time of gelling at a relatively low temperature, the pH-increasing reactant may comprise a stoichiometric mixture of urea and nitrite iones; and, to lengthen that time, that reactant may contain an excess of urea so that part of the pH-increasing will depend upon the hydrolysis of urea, which is relatively slow at a relatively low temperature. In addition, the delay time decreases with increases in the concentration of polyvalent metal and, for example, precipitations within about 30 minutes at 130°F can be attained with a one molar solution of aluminum chloride.

Gel times can also be varied by adjusting the urea concentration. The gel time decreases substantially logarithmically with increases in $R_u$.

A simple titration procedure was developed for determining the aluminum concentration and $R_i$ values of plugging systems such as the present system. Since the alumina colloid is stabilized at low pH by adsorbed $H^+$, gellation may be achieved by the hyrolysis of urea, producing ammonia, which increases the pH. When the molar ratio ($R$) of $NH_3$ to $Al^{+3}$ is about 2.4, the alumina colloid is destabilized and a gel is formed. Owing to the relatively slow hydrolysis of urea, excessively long gel times would result if urea were the only source of $H^+$ neutralizing base. Gel times are decreased by adding base ($NH_4OH$ or $KOH$) directly to produce an $R_i$ value (initial $R$ value) slightly less than that required for gelation, $R_i = 2.2 - 2.3$. This initial $R$ value can be determined by titrating the excess acid remaining in the system with a standard sodium hydroxide solution. Similarly, prior to the addition of base, i.e., $R_i = 0$, the concentration of the aluminum can be determined by titrating the total amount of acid in the system.

In these analyses, the excess acid is titrated to the bromothymol blue indicator end point (yellow-blue) with 1.0 N NaOH. The $Al^{+3}$ concentration and $R_i$ values are then calculated using the appropriate empirically determined correction factors as follows:

$Al^{+3}$ concentration (moles/liter) $= V_t M_t / V_s C_1$ $$R_i = C_2 V_s M_s - V_t M_t$$

where
$V_s$ = volume $Al^{+3}$ solution
$M_s$ = $Al^{+3}$ concentration, moles/liter
$V_t$ = volume NaOH liter
$M_t$ = concentration of NaOH titer, moles/liter
$C_1 = 2.8$ (empirically determined)
$C_2 = 2.7$ (empirically determined)

The correction factors, $C_1$ and $C_2$, will vary with the indicator used. Those shown are for bromothymol blue. Although other indicators could be used with pH changes in the range $pH = 5 - 9$, bromothymol blue was selected as it had the easiest detected end point. The test procedures are as follows.

Aluminum concentration. (This titration must be done before any base is added to the system.)

a. Into a 100 ml beaker, 1. 5 ml $Al^{+3}$ solution 2. 35 ml distilled water 3. 1 ml bromothymol blue indicator b. Titrate with 1.0N NaOH to light blue-green end point. When the solution gels part way through the titration, stop addition of NaOH until gel breaks then continue titration.

c. $Al^{+3}$ concentration (moles/liter) = (ml 1.0N Naoh)/14

$R_i$ Value Titration a. Into a 100 ml beaker, add: 1. 20 ml of test solution 2. 20 ml of distilled water 3. 1 ml of bromothymol blue indicator b. Titrate with 1.0 NaOH to light blue-green end point. Stop titration when gel forms until gel breaks.

$$R_i = \frac{54(M_s) - (\text{ml. 1.0N NaOH})}{M_s}$$

where
$M_s$ = concentration of $Al^{+3}$ (moles/liter)

The results of a series of experiments using a typical alumina gelling system containing 0.5 moles/liter aluminum chloride are summarized in Table 2. It can be seen that at 190°F oxalic acid in a concentration ratio $R = 0.08$ reduced the gel time from about 430 minutes to 235 minutes, whereas citric acid reduced the gel time to 60 minutes. In addition, at 200°F a citric concentration of $R = 0.08$ produced a tenfold decrease in gel times.

TABLE 2

| Concentration (Moles/Mole $Al^{+3}$) | Oxalic Acid $R_{NH_3} = 2.1$ Gel Times (minutes) 190°F | Sodium Citrate Gel $R_{NH_3} = 2.3$ Times at 190°F | 200°F |
|---|---|---|---|
| 0 | 430 | 350 | 200 |
| 0.02 | 330 | 230 | 115 |
| 0.04 | 300 | 140 | 65 |
| 0.06 | 270 | 100 | 36 |
| 0.08 | 235 | 60 | 22 |
| 0.1 | 220 | | |

In the same system, tartaric acid, at 190°F and concentrations of 0.02 moles of tartaric acid per mole of aluminum ion of $R_{NH_3} = 2.1$, provided a gel time of 315 minutes.

It should be noted that the gels produced in the presence of various individual incompletely dissociated polyvalent acids may vary in gel strength. For example, the gels produced in the presence of citric acid have a gel strength of considerably less than those produced in the presence of oxalic acid. At citric acid concentrations of $R$ greater than 0.1, the alumina tends to precipitate in the form of particulate metal hydroxides without forming a gel.

What is claimed is:

1. A process for distributing a plugging agent substantially uniformly throughout the more permeable portion of a permeable region having a non-uniform permeability, comprising:

injecting fluid into said permeable regions so that a flow stream is established between the fluid source and the most permeable zone within said region;

including in said fluid being injected into the permeable region an aqueous solution that contains a dissolved salt of a polyvalent metal that forms a gelatinous metal hydroxide, a dissolved pH-increasing reactant and a dissolved incompletely dissociated polyvalent acid; and correlating the composition of said aqueous solution with the temperatures in said permeable region and the location at which said solution is compounded and with the rate of said fluid injection, so that the metal hydroxide precipitation occurs within each portion of said solution within a selected relatively short time after it enters said permeable region.

2. The process of claim 1 in which said permeable region is a subterranean reservoir encountered by a well that contains means for conveying fluid to said reservoir, said reservoir has a temperature of from about 120–190°F and said pH-increasing reactant consists essentially of a mixture of nitrite ions and urea.

3. A process for plugging a permeable subterranean region in or around the bore hole of a well, which process comprises:

injecting fluid into the permeable region;

including in the injected fluid an aqueous solution that contains a dissolved salt of a polyvalent metal which forms a gelatinous metal hydroxide, a dissolved pH-increasing reactant, and a dissolved incompletely dissociated polyvalent acid; and correlating the composition of the injected fluid with the temperatures in said permeable location and the location in which the fluid is compounded and with the rate of fluid injection, so that the metal hydroxide precipitation occurs within at least some portions of the fluid while those portions are within the permeable region.

4. The process of claim 3 in which said injected aqueous solution contains urea and sufficient dissolved alkaline material to provide a pH that is raised to a metal hydroxide-precipitating pH within a selected relatively short time by the hydrolysis and ionization reactions of urea and said polyvalent acid at a temperature of from about 120–190°F.

5. The process of claim 3 in which said dissolved metal salt is an aluminum salt and said pH increasing reactant consists essentially of a mixture of urea and nitrate ions containing a stoichiometric excess of urea.

6. The process of claim 3 in which said injected aqueous solution contains a dissolved alkali metal cyanate that increases the initial pH of the solution.

* * * * *